US009359183B2

(12) United States Patent
Henderson

(10) Patent No.: US 9,359,183 B2
(45) Date of Patent: Jun. 7, 2016

(54) FLAVORED POURING DISPENSER

(71) Applicant: Alan Henderson, Naples, FL (US)

(72) Inventor: Alan Henderson, Naples, FL (US)

(73) Assignee: Carlon Holdings LLC, Indianapolis, IN (US)

( * ) Notice: Subject to any disclaimer, the term of this patent is extended or adjusted under 35 U.S.C. 154(b) by 231 days.

(21) Appl. No.: 13/829,480

(22) Filed: Mar. 14, 2013

(65) Prior Publication Data

US 2014/0260997 A1 Sep. 18, 2014

(51) Int. Cl.
*A47J 31/06* (2006.01)
*B67D 3/00* (2006.01)

(52) U.S. Cl.
CPC ............ *B67D 3/0003* (2013.01); *B67D 3/0041* (2013.01)

(58) Field of Classification Search
CPC ........................................................ B67D 3/00
USPC ........... 426/77, 85, 86, 87, 91, 104, 112, 115, 426/134, 132, 120, 421, 590; 210/120, 136, 210/295, 282; 99/279, 295, 323, 495, 285, 99/298, 300
See application file for complete search history.

(56) References Cited

U.S. PATENT DOCUMENTS

| | | | | |
|---|---|---|---|---|
| 5,094,861 | A | 3/1992 | D'Auguste et al. | |
| 5,681,564 | A | 10/1997 | Saulson | |
| 6,109,538 | A | 8/2000 | Villani et al. | |
| 6,399,126 | B1 | 6/2002 | Weldon | |
| 6,540,112 | B1 | 4/2003 | Studnik | |
| 6,569,329 | B1 * | 5/2003 | Nohren, Jr. | 210/282 |
| 6,854,595 | B2 | 2/2005 | Kiser | |
| 7,798,056 | B2 | 9/2010 | Kramer | |
| 7,851,003 | B2 | 12/2010 | Zeng | |
| 2002/0074056 | A1 | 6/2002 | Olsen | |
| 2004/0007594 | A1 | 1/2004 | Esch et al. | |
| 2004/0013772 | A1 | 1/2004 | Weiss et al. | |
| 2004/0050865 | A1 | 3/2004 | Lizerbram et al. | |
| 2006/0040019 | A1 | 2/2006 | Cecere | |

(Continued)

FOREIGN PATENT DOCUMENTS

| | | | |
|---|---|---|---|
| WO | WO2010050646 | A1 | 5/2010 |
| WO | WO2010050647 | A1 | 5/2010 |

OTHER PUBLICATIONS

Authorized Officer Blaine R. Copenheaver, International Search Report and Written Opinion for International Application No. PCT/US2014/027399 mailed Jul. 25, 2014, 11 pages.

(Continued)

*Primary Examiner* — Phuong Nguyen
(74) *Attorney, Agent, or Firm* — Fish & Richardson P.C.

(57) ABSTRACT

A bottle pouring dispenser featuring a dispenser housing having a lower end configured to be removably attached to and cover an open end of a bottle. The bottle pouring dispenser includes a valve providing one-way hydraulic communication from the bottle to a chamber defined within the dispenser housing. The dispenser housing has upper and lower chamber portions. A flavorant is disposed within the upper chamber portion in solid form and it is dissolvable in liquid so as to add flavoring to liquid flowing through the chamber. The flavorant is held spaced above a floor of the chamber, such that a lower portion of the chamber defines a drain volume beneath the flavorant for receiving liquid draining from about the flavorant. The bottle pouring dispenser further includes a pour spout extending from an upper end of the dispenser housing, for dispensing the flavored liquid from the chamber.

23 Claims, 10 Drawing Sheets

(56) References Cited

U.S. PATENT DOCUMENTS

| | | | | |
|---|---|---|---|---|
| 2007/0023300 | A1 | 2/2007 | Spector et al. | |
| 2007/0102332 | A1* | 5/2007 | Bommi et al. | 210/136 |
| 2007/0151460 | A1 | 7/2007 | Beck | |
| 2007/0215496 | A1 | 9/2007 | Scarborough | |
| 2008/0014326 | A1 | 1/2008 | Hannsz | |
| 2008/0116086 | A1 | 5/2008 | Hung | |
| 2008/0282908 | A1* | 11/2008 | Cole et al. | 99/495 |
| 2009/0236303 | A1* | 9/2009 | Lizerbram et al. | 215/227 |
| 2010/0163441 | A1 | 7/2010 | Kim | |
| 2010/0187257 | A1 | 7/2010 | Roth et al. | |
| 2010/0310730 | A1* | 12/2010 | Steelberg | 426/115 |
| 2011/0083977 | A1 | 4/2011 | Lee et al. | |
| 2011/0089059 | A1 | 4/2011 | Lane et al. | |
| 2011/0303561 | A1 | 12/2011 | Zheng | |

OTHER PUBLICATIONS

Authorized Officer Phuong Nguyen, International Preliminary Report on Patentability for International Application No. PCT/US2014/027399 mailed Feb. 6, 2015, 22 pages.

* cited by examiner

FLAVORED POURING DISPENSER

TECHNICAL FIELD

The present invention relates to adding flavors to consumable liquids using a pouring dispenser, and particularly to the flavoring of alcoholic drinks.

BACKGROUND

Adding flavorant to beverages is increasingly popular. For example, a cocktail type flavor is often added to liquor. Currently available pre-flavored beverages often require, among other things, stocking several flavors of a beverage base. It is usually preferred to serve flavored beverages without flavoring the entire content available in a storage container, thereby decreasing the storage area. Typically, adding a flavorant to beverages is done by pouring separate contents into a recipient, in discrete, measured amounts, and then dissolving the flavorant and homogeneously mixing the flavorant in the beverage by stirring. Generally this is done one drink at a time, in order to not waste ingredients. Further advances in methods and products for adding flavorants to beverages are sought, for both home and bar use.

SUMMARY

Various aspects of the invention feature a bottle pouring dispenser featuring a dispenser housing having a lower end configured to be removably attached to and cover an open end of a bottle. The bottle pouring dispenser includes a valve providing one-way hydraulic communication from the bottle to a chamber defined within the dispenser housing. The dispenser housing has upper and lower chamber portions. A flavorant is disposed within the upper chamber portion in solid form and it is dissolvable in liquid so as to add flavoring to liquid flowing through the chamber. The flavorant is held spaced above a floor of the chamber, such that a lower portion of the chamber defines a drain volume beneath the flavorant for receiving liquid draining from about the flavorant. The bottle pouring dispenser further includes a pour spout extending from an upper end of the dispenser housing, for dispensing the flavored liquid from the chamber.

In some implementations, the bottle pouring dispenser includes a venting tube defining an unimpeded air path providing hydraulic communication between the bottle and atmosphere.

According to one aspect of the invention, the lower portion of the chamber defines a minimum drain volume of 5 ml.

In some examples, the flavorant is in a granular form, the dispenser containing multiple flavorant granules. The bottle pouring dispenser includes a barrier disposed between the upper and lower chamber portions, defining drain passages smaller than the flavorant granules, such that the flavorant granules are prevented from passing into the lower chamber portion. In some examples, the granules are substantially spherical. In some examples, the granules are substantially cubical. Each granule has an internal flavorant concentration that varies from a surface to a core of the granule.

In some examples, the flavorant is in a waffle form. In some examples, the flavorant is included within a bag. In some examples, the flavorant is in the form of a unitary solid mass. In some examples, the flavorant is deposited on one or more walls of the upper chamber portion. In some examples, the flavorant includes a colorant. In some examples, the flavorant is dissolvable in alcohol.

In some implementations, the bottle pouring dispenser includes a partially transparent wall through which the upper chamber portion is visible from outside the dispenser.

In some implementations, the upper chamber portion is removably attached to the lower chamber portion and removable so as to enable refilling of the upper chamber portion with flavorant. In some implementations, the upper chamber portion and the lower chamber portion are encapsulated in a compact protective layer.

In some implementations, the upper chamber portion defines a plurality of compartments, each alternatively selectable for hydraulic communication with the bottle through the valve and each compartment contains a different flavorant. In some examples, the first of the compartments contains a flavorant and a second of the compartments is free of flavorant, the dispenser being manually configurable to either pass liquid through the first compartment for flavoring, or to pass liquid through the second compartment without flavoring.

In some implementations, the lower end of the bottle pouring dispenser is one of a snap on and a screw on type.

Another aspect of the invention features a bottle pouring dispenser including a dispenser housing having a lower end configured to be removably attached to and cover an open end of a bottle and a chamber defined within the dispenser housing and having upper and lower chamber portions. A flavorant is disposed within the upper chamber portion in solid form and is dissolvable in liquid so as to add flavoring to liquid flowing through the chamber. The flavorant is held spaced above a floor of the chamber, such that a lower portion of the chamber defines a drain volume beneath the flavorant for receiving liquid draining from about the flavorant. A pour spout extends from an upper end of the dispenser housing, for dispensing flavored liquid from the chamber. The bottle pouring dispenser further includes means for preventing flow of fluid from the dispenser back into the bottle. In some examples, the means for preventing flow includes a trap tube.

By ‘flavorant’ I mean a soluble substance that alters the flavor of a beverage. As sweetness is one aspect of flavor, a soluble sweetener is an example of a flavorant.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
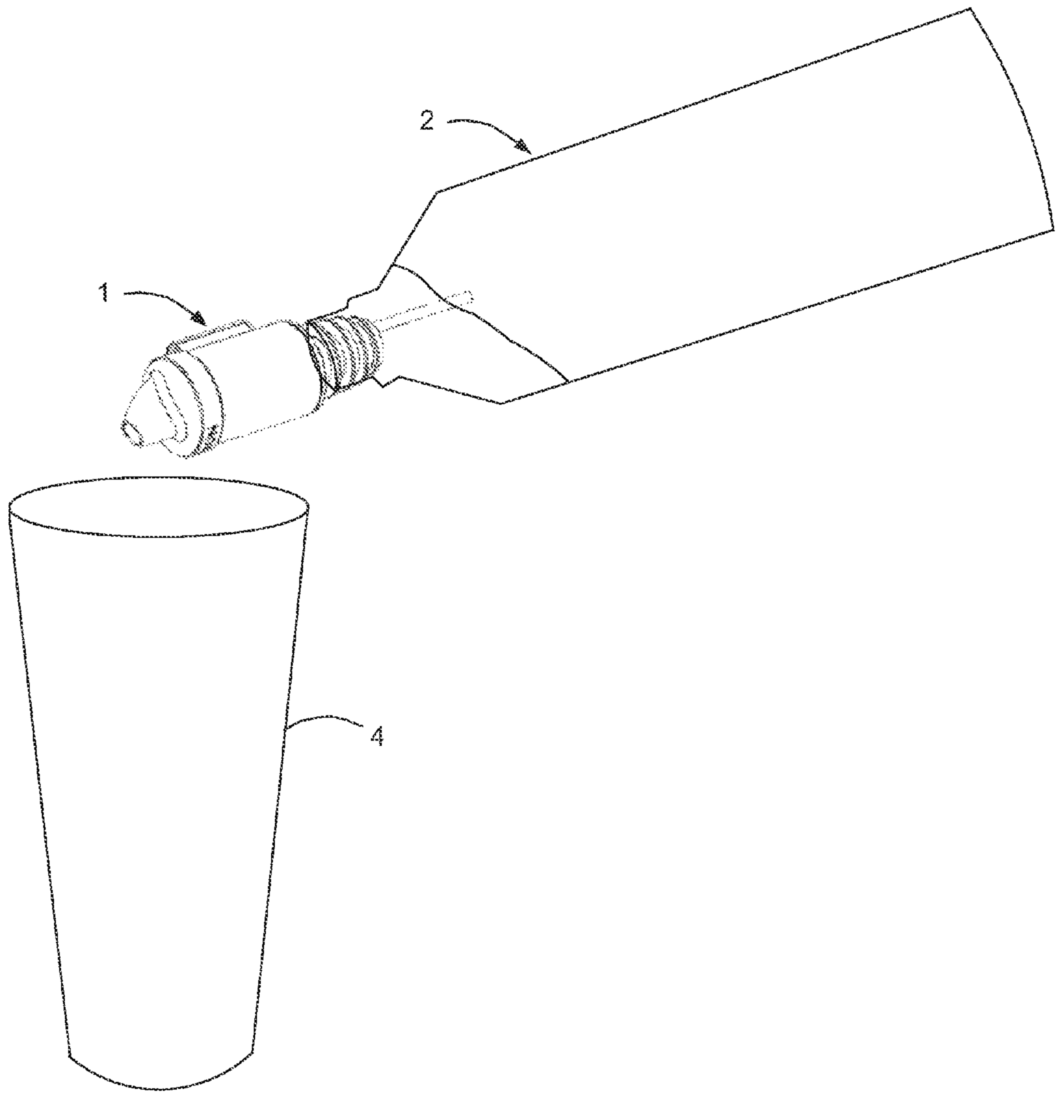
FIG. 1 illustrates pouring a drink through a pouring dispenser attached to a bottle filled with liquid.

Referring first to FIG. 1, a pouring dispenser 1 is attached to a bottle 2. The pouring dispenser 1 contains a flavorant (shown in subsequent figures). In use, a user can remove the conventional cap of the bottle 2, such as a bottle containing an alcoholic base liquid, and then attach the pouring dispenser 1 to the open end of the bottle 2. As the bottle 2 is inverted, the liquid flows through the pouring dispenser 1, where it mixes with the flavorant and it is poured into a glass 4 as a flavored drink.

In some implementations, the pouring dispenser 1 is formed from sturdy, non-reactive, durable, lightweight materials suitable for use with beverages, such as suitable polymers.

Bottle 2 may be, for example, a conventional liquor bottle as distributed by purveyors of alcoholic beverages, and may be provided with a threaded spout. For example, bottle 2 may be a one-liter bottle of vodka, tequila, rum, gin or other similar substance. In some other cases, bottle 2 may contain water juice, or other consumable liquid.

Figure 2:
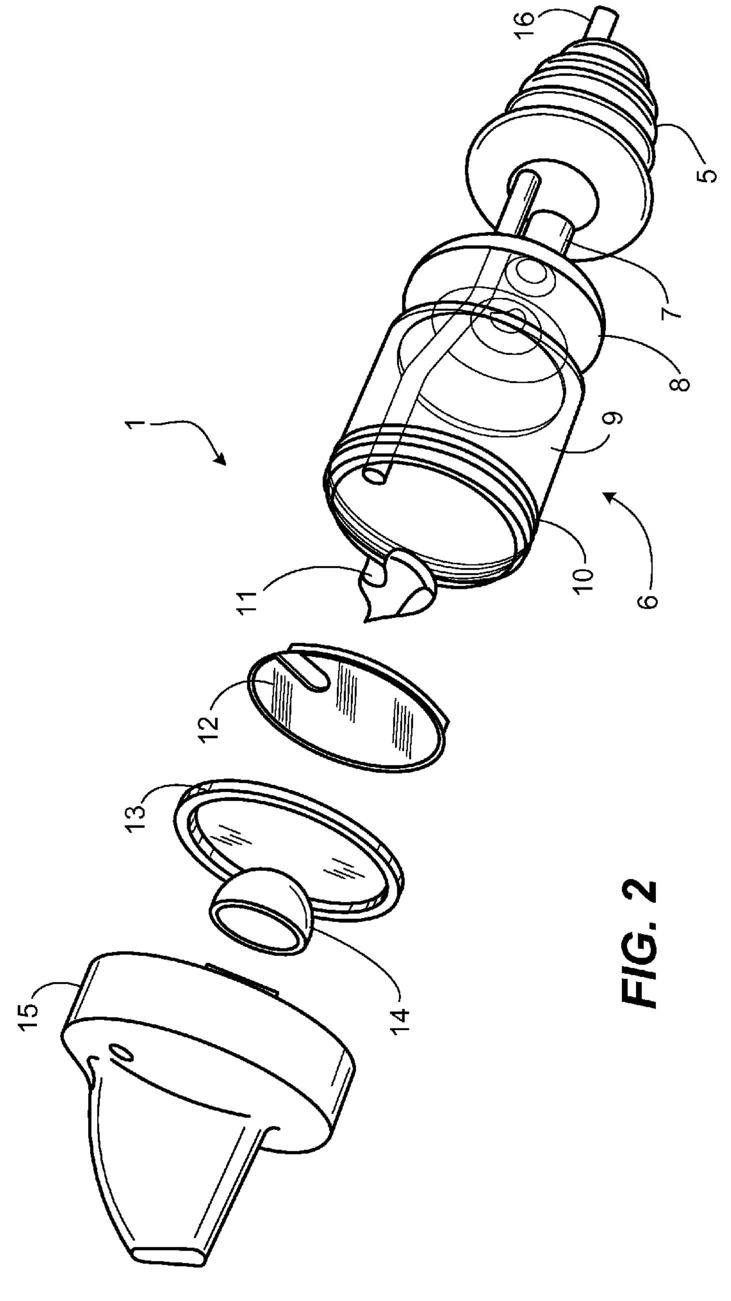
FIG. 2 is an exploded view of the pouring dispenser, showing its components.
Figures 3A, 3B, 3C, 3D:
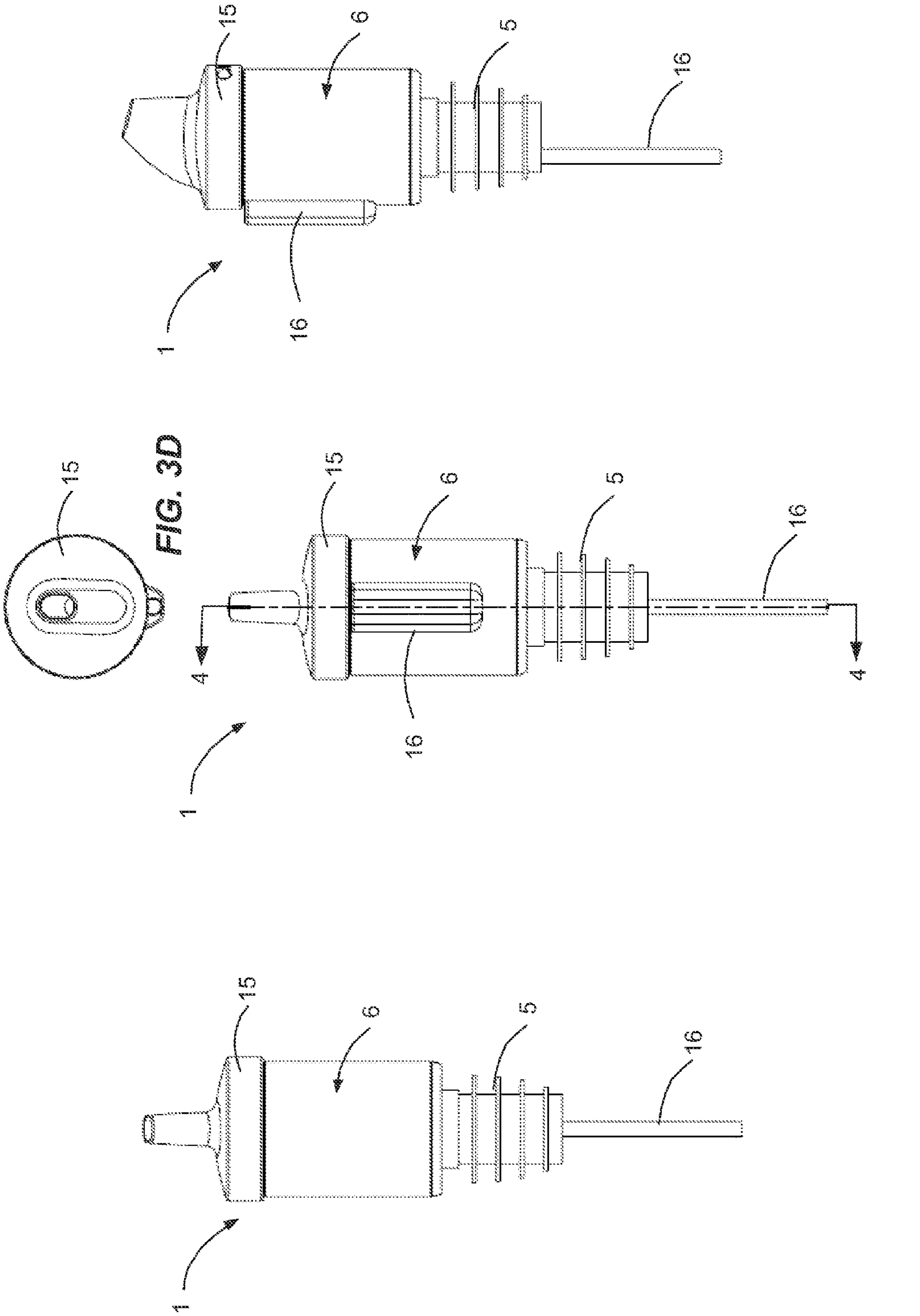
FIG. 3A shows a front view of the pouring dispenser.
FIG. 3B shows a rear view of the pouring dispenser.
FIG. 3C shows a side view of the pouring dispenser.
FIG. 3D shows a top view of the pouring dispenser.

Referring next to FIG. 2, pouring dispenser 1 includes a base 5, a dispenser housing 6, a pour spout 15 and a venting tube 16. The dispenser housing 6 includes a liquid intake 7, a lower chamber portion 8, an upper chamber portion 9, a threaded top 10, a valve 11, a filter 12, an O-ring gasket 13, and a filter 14.

Base 5 is connected to the dispenser housing 6 and is configured to be removably attached to and cover an open end of a bottle (e.g., bottle 2 in FIG. 1). Base 5 is substantially cylindrical in shape and defines a channel accommodating the venting tube 16. The base also defines a passage extending through the base and providing hydraulic communication from the bottle interior to liquid intake 7.

In this example, the outside surface of the base 5 features a series of flexible flanges, of decreasing diameter from top to bottom, such that the base functions as a bottle stopper when mounted on bottles of different inner neck diameters. In use, the base 5 is pressed into the open end of the bottle, and may be slightly rotated to help form a seal between base 5 and the bottle.

In another example (not shown), the base of the dispenser has interior threads configured to engage corresponding threads about the bottle opening, such that the dispenser replaces the cap of the bottle during use. In some cases, the dispenser is provided with different types and/or sizes of interchangeable bases, for accommodating different bottle configurations.

The liquid intake 7 of the dispenser housing 6 provides a flow path for liquid from the base 5 to the dispenser housing 6. The upper end of liquid intake 7 is connected to the lower chamber portion 8, and a one-way valve (see valve 11 in FIG. 4A) is provided at the upper end of liquid intake 7, at the entrance to chamber portion 8. Valve 11 provides a one-way hydraulic communication from the bottle to the lower chamber portion 8 of the dispenser housing 6. Thus, valve 11 enables liquid to pass from the liquid intake 7 into the lower chamber portion 8 as the dispenser housing 6 is inverted. Valve 11 also prevents liquid from returning to the liquid intake 7 (and consequently to the bottle) when the dispenser housing 6 is subsequently righted. Valve 11 may be in the form of a duckbill valve, an umbrella valve, a flapper valve, sink trap style, or similar type of one-way sealing valve.

In this example, the dispenser housing 6, including the lower chamber portion 8 and the upper chamber portion 9, is substantially cylindrical. Upper chamber portion 9 contains the flavorant 3, and a filter 12 holds the solid pieces of flavorant 3 spaced above the lower chamber portion 8, to prevent the flavorant from continuing to dissolve in liquid post pour, such that the lower chamber portion 8 defines a drain volume beneath the flavorant for receiving liquid draining from the upper chamber portion 9.

Flavorant 3 is illustrated as being in solid form, and is dissolvable in the liquid from the bottle, so as to add flavoring to the liquid as it flows through the upper chamber portion 9 as a drink is poured. As discussed below, the flavorant 3 may be provided as discrete, disconnected particles, either loose or contained within a flexible, porous bag, or may be in the form of one or more layers deposited on the walls of the upper chamber portion 9, in which case filter 12 may be omitted. When using disconnected flavorant particles, such as beads or spheres or other shapes, the mesh size of filter 12 should be selected to be smaller than the size of the pieces of flavorant 3, to prevent the flavorant from settling on the floor of the lower chamber portion, and thus providing a flavorant-free drain space in which liquid may drain from the flavorant particles and not continuously leech flavorant between uses.

In some embodiments, the flavorant 3 is dissolvable in alcohol, in water, or in both alcoholic and non-alcoholic liquids. In some implementations, flavorant 3 contains a colorant, providing the mixed drink a particular color. For example, the colorant can be any FDA approved color additive that produces stable colors in beverages at pH values from about 2.0 to about 8.0.

The pouring dispenser housing 6 may have at least partially transparent walls, through which the upper chamber portion 9 is visible from outside the pouring dispenser 1, for visually discerning the remaining amount of flavorant 3 inside the upper chamber portion 9. In some examples, a user can evaluate the concentration of flavored liquid inside the upper chamber portion 9 through the transparent walls, when using a flavorant 3 containing colorants.

The dispenser may be provided as a disposable product, intended to be discarded when the flavorant is exhausted. Alternatively, the dispenser may be designed to be refilled with flavorant. In one such example, upper chamber portion 9 includes a threaded top 10, enabling removal of pour spout 15 for accessing the upper chamber. Top 10 may also be made to snap on tight with a gasket for the design with an internal or external vent tube, in an internal model it allows the vent tube to be properly lined up upon closing the top. An O-ring gasket 13 can be placed between upper chamber portion 9 and pour spout 15 to seal the attachment. If permanently sealed for disposal, a protective covering (not shown) may be formed about the connection between spout and chamber wall, to aid in sealing. Such a layer may also serve to retain, and seal about, the vent tube.

Pour spout 15 extends as a nozzle from a base, which is attached to the upper end of the dispenser housing 6, to a tip with an open end. The pour spout 15 may be inclined at an angle (e.g., 30°), as illustrated, for ease of pouring.

Pour spout 15 includes a filter 14 that retains undissolved flavorant 3 in upper chamber portion 9 prevents undissolved pieces of flavorant 3 from falling into the drinking container chamber portion 9 when the dispenser is inverted.

Venting tube 16 enables unrestricted passage of air from inside the bottle to the atmosphere, avoiding development of a vacuum within the bottle when pouring the liquid.

In some embodiments (not shown in FIG. 2), the pouring dispenser 1 can further include means for pouring a measured volume (e.g., steel balls), which limits the volume of liquid that flows through the pouring dispenser 1 until the bottle is again righted and then inverted to commence another pour.

In some implementations, as illustrated in FIGS. 3A-3D, the housing of the pouring dispenser 1 is generally symmetrical with respect to its longitudinal axis (which corresponds to the longitudinal axis of a mated bottle neck), but has a side boss accommodating the venting tube 16. The size of the dispenser is such that it does not interfere with the handling and inversion of a bottle to which it is connected, and does not overly increase the overall height of the bottle. However, the dispenser should be large enough to contain a quantity of flavorant sufficient for flavoring multiple drinks. In the example illustrated in these figures, the overall length of the dispenser, as measured from the top of an attached bottle, is about 12.7 cm (5 inches), and the overall width of the dispenser, measured at the vent tube boss, is about 2.8 cm (1.13 inches).

Figure 4A:
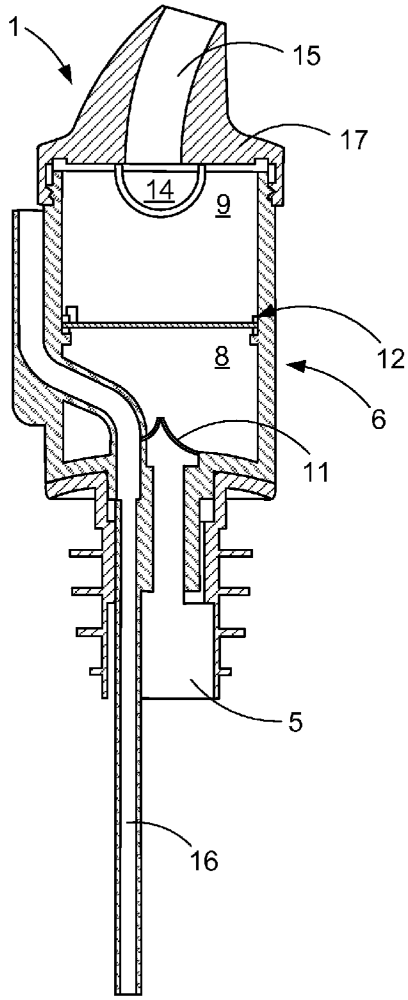
FIG. 4A is a cross-sectional view, taken along line 4-4 in FIG. 3B, with the dispenser empty of flavorant.
Figure 4B:
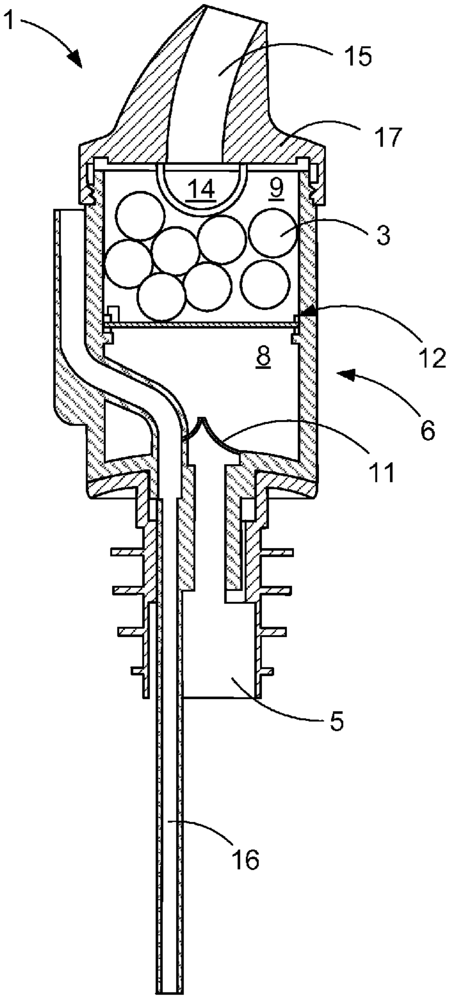
FIG. 4B is a cross-sectional view, taken along line 4-4 in FIG. 3B, with the dispenser filled with flavorant.

Referring next to FIGS. 4A and 4B, the volume of upper chamber portion 9 should be sufficient to contain a desired amount of flavorant. In this example, the volume of upper chamber portion 9, between filters 12 and 14, is 15 ml (0.5 oz.). Preferably, the volume of upper chamber portion 9 would be at least 5 ml and at most 50 ml. The volume of lower chamber portion 8 should be sufficient to contain at least most of any liquid retained in upper chamber portion 9 at the end of a drink pour, as it drains back into lower chamber portion 8. The volume of lower chamber portion 8 should therefore be selected as a function of the interstitial space about the flavorant pieces, if there is not sufficient room to match the volumes of the upper and lower chambers. In this example, the volume of lower chamber portion 8 is 15 ml (0.5 oz.), and for most applications will preferably be at least 5 ml and at most 50 ml.

With the dispenser mounted on the top of a bottle and the bottle inverted for pouring, liquid from the bottle will continuously and sequentially pass through base 5, valve 11, lower chamber portion 8, filter 12, upper chamber portion 9, filter 14 and pour spout 15, while air flows into the bottle unimpeded through venting tube 16. As the liquid flows through upper chamber portion 9 it comes in contact with, and dissolves flavorant 3, which is continuously mixed with the liquid within the upper chamber and dispensed through spout 15.

Figure 5:
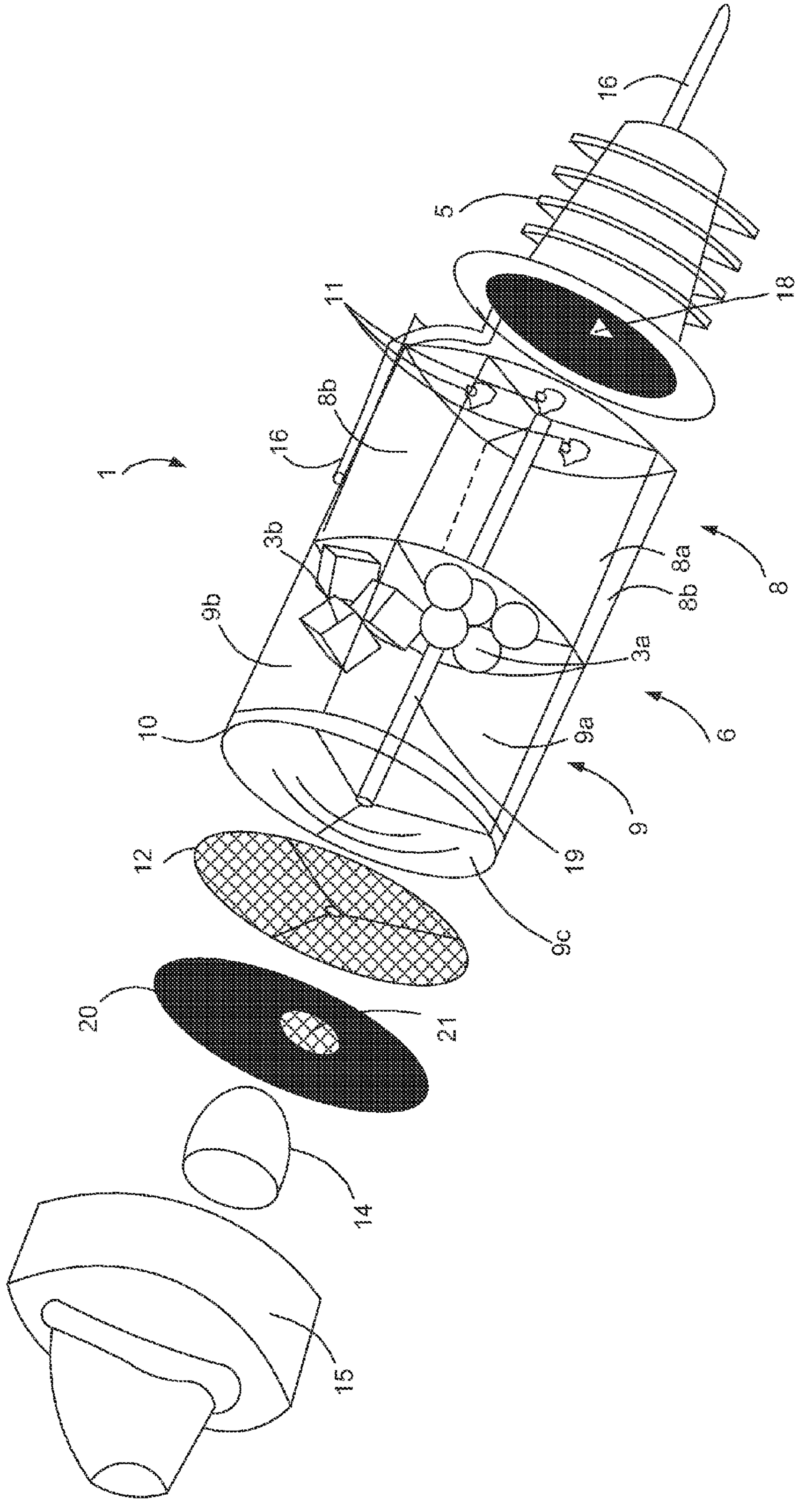
FIG. 5 is a schematic representation of a pouring dispenser with multiple flavorant compartments in addition to a flavorless compartment

FIG. 5 illustrates a schematic representation of a dispenser housing 6 defining multiple compartments 9*a*, 9*b* and 9*c* positioned in the upper chamber portion 9, corresponding to drainage compartments 8*a*, 8*b* and 8*c* positioned in the lower chamber portion 8. The pouring dispenser 1 includes a disk 20 defining an aperture 21. Disk 20 is attached to the bottom end of the pouring spout 15.

This example enables a user to select different flavoring effects by rotating the dispenser housing 6 to place a desired chamber in alignment with a single filtered aperture 18 in the base of the dispenser. The base of each drainage compartment 8*a*, 8*b* and 8*c* of the lower chamber portion 8 is equipped with its own one-way valve 11.

One or more of the compartments contain different types of flavorant (e.g., in this illustration compartments 9*a* and 9*b* contain flavorant 3*a* and 3*b*, respectively). Each type of flavorant may have a distinct geometry and/or color, allowing a user to recognize which flavorant has been selected. In this example, flavorant 3*a* is illustrated as in the form of spherical pieces and flavorant 3*b* is illustrated as cubes. In this example a third compartment 9*c* contains no flavorant.

A user can rotate dispenser housing 6 about a connecting rod 19 connecting the base of the dispenser to the pour spout 15 and disk 20 at the top of the dispenser, thereby aligning a selected compartment with apertures 18 and 21. When pouring, the liquid flows through the aperture 18 and the one-way valve 11 of the selected chamber into the corresponding drainage compartment (e.g., 8*a*) of the lower chamber portion 8 and through the filter 12 into the corresponding compartment (e.g., 9*a*) of the upper chamber portion 9, where the flavorant (e.g., 3*a*) is dissolved by the liquid and dispensed through spout 15. In some implementations, the upper surface of each flavorant chamber can be contoured to prevent the flavorant from blocking all of the holes through which the flavored fluid flows to the spout. Seals (not shown) seal against leakage at the interfaces between the ends of housing 6 and the non-rotating portions of the dispenser. Vent 16 may extend up one side of the housing as shown. Alternatively, central rod 19 may be a hollow tube leading up through disk 20 and venting at the pour spout.

Figure 6:
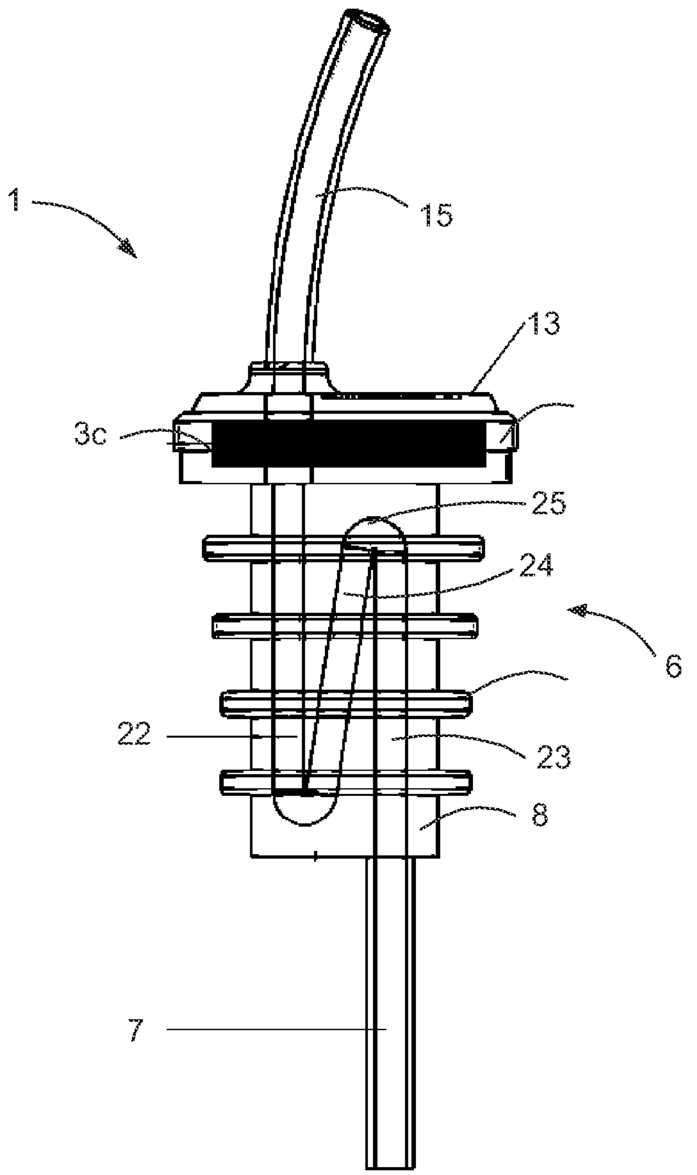
FIG. 6 is a schematic representation of a pouring dispenser reservoir including a flavorant wafer.

FIG. 6 illustrates an example of a pouring dispensers 1 designed to provide an alternative one-way hydraulic communication from the bottle to the chamber 6. The pouring dispenser 1 includes a trap tube 22 disposed in the lower chamber portion 8. The trap tube 22 includes at least two straight sections 23 and 24, joined at a bent elbow 25 that forms an acute angle. In some implementations, the trap tube 22 is Z-shaped. In the example of FIG. 6, the lower chamber portion 8 is sized to fit within the bottle opening, such that the lower chamber volume is contained within dispenser base 5. The flavorant 3 in this example is in the form of a loose cylindrical disk, as discussed below with respect to FIG. 8C.

Figure 7:
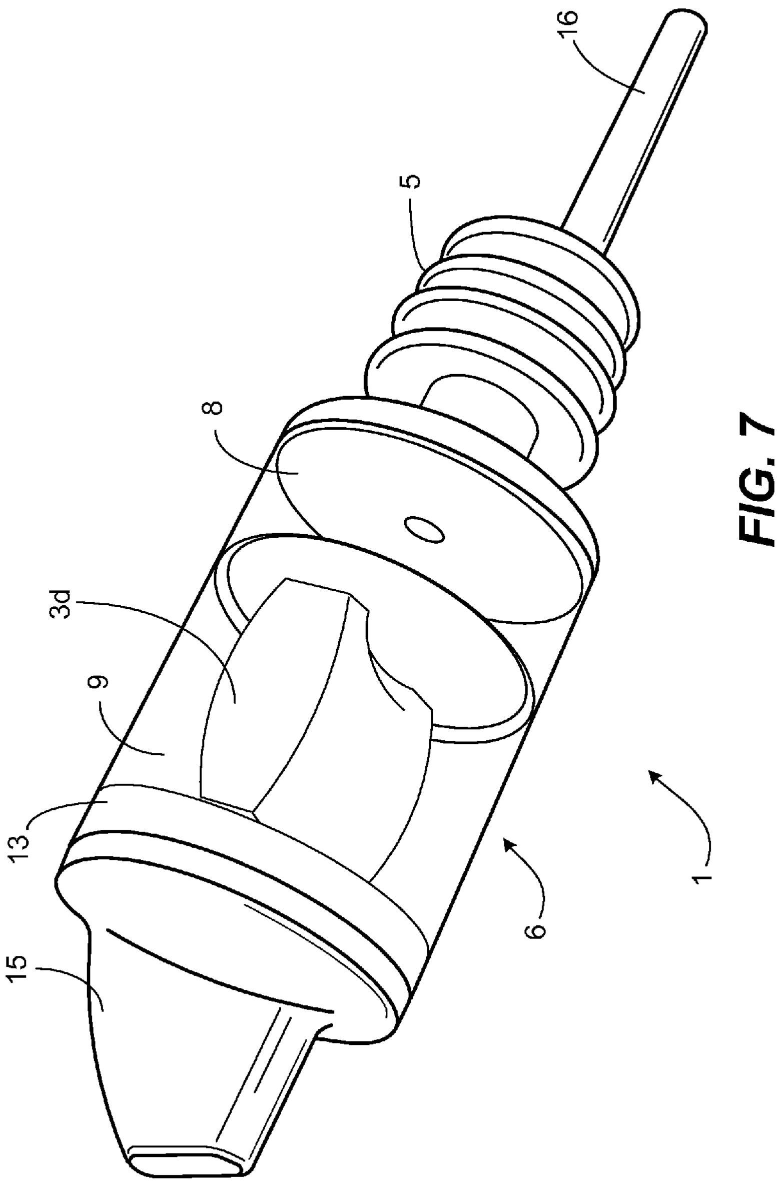
FIG. 7 is a schematic representation of a pouring dispenser containing a flavorant bag.

In the example of FIG. 7, the flavorant is in the form of particles contained within a bag 3*d*. In some implementations the bag with flavorant 3*d* is loosely contained by the upper chamber portion 9.

Figure 8B:
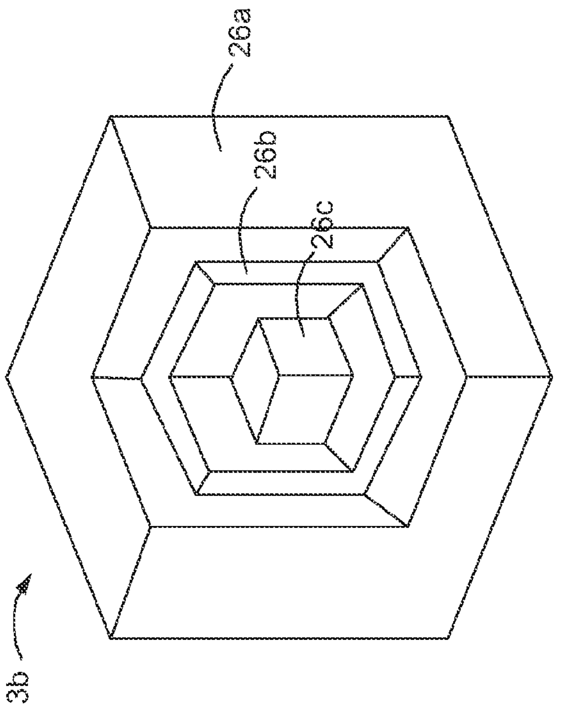
FIG. 8B is a schematic representation of a cubical flavorant granule.
Figure 8A:
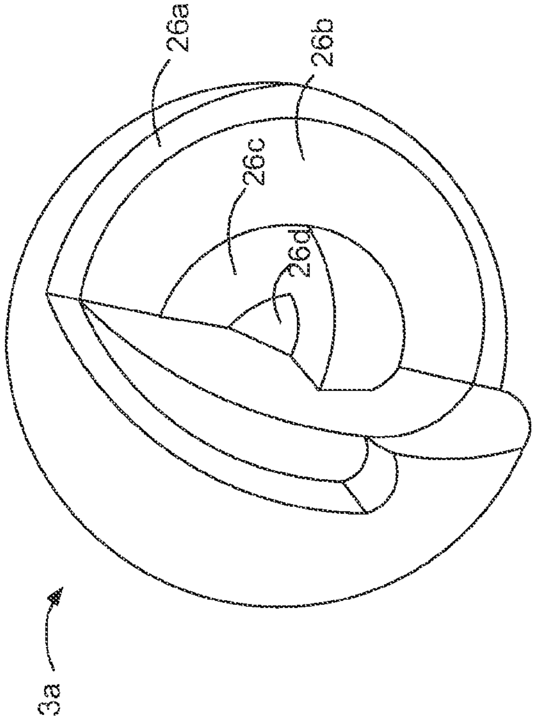
FIG. 8A is a schematic representation of a spherical flavorant granule.
Figure 8C:
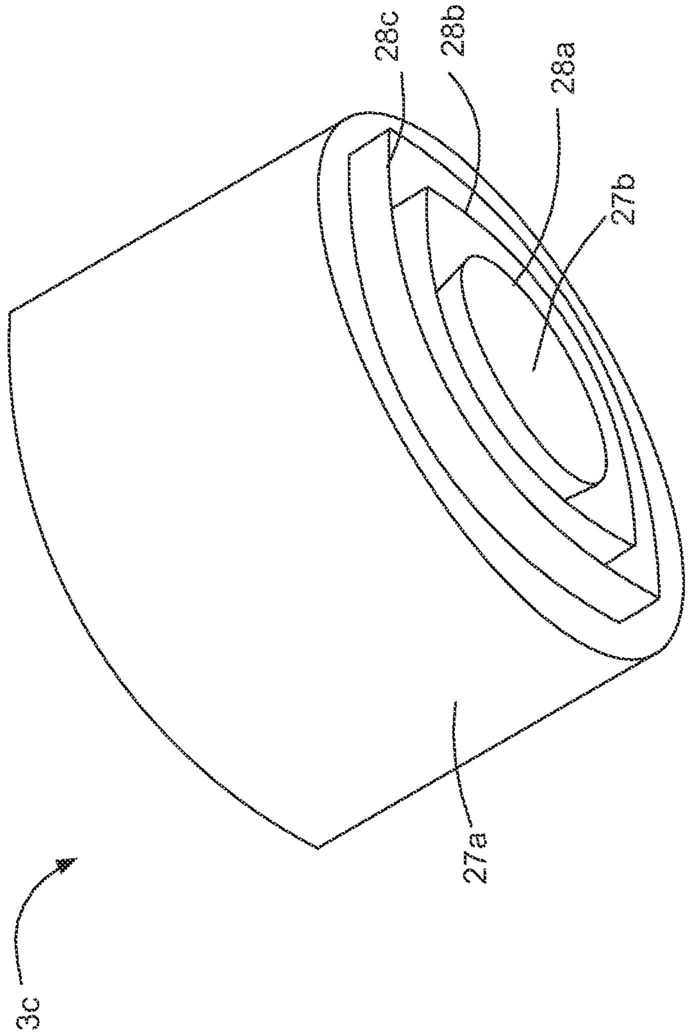
FIG. 8C is a schematic representation of a flavorant wafer.

FIGS. 8A and 8B illustrate example flavorant granules that contain flavorant in varying concentrations. In each of these examples, the flavorant granule includes a plurality of concentric flavorant layers 26*a*, 26*b*, 26*c* and 26*d*. The concentration of flavorant increases layer by layer from the outer layer 26*a* towards the core 26*c*, or 26*d* in 7*a* 7*b* inversely proportional with the layer's area. Thus, the combination of variation of concentration of flavorant with the variation of the surface area of each layer 26*a*, 26*b*, 26*c* and 26*d* helps to maintain a more constant overall dissolution rate of the flavorant into the liquid over a series of drinks. Flavorant granules can be provided with distinct layers of different concentrations, as shown, or may be provided with a concentration that gradually increases from surface to center. Alternatively, flavorant granules may comprise an outer layer of dissolvable flavorant carried on a non-dissolvable core that becomes exposed as the flavorant is exhausted, perhaps providing a visual indication that the flavorant is used up. In some embodiments, the flavorant layers 26*a*, 26*b*, 26*c* and 26*d* have equal concentrations.

8C, flavorant disk 3*c* has an outer surface 27*a* and defines a central passage bounded by an inner surface 27*b*, which is extending the length of the disk. During use, liquid comes in contact with both the outer surface 27*a* and the inner surface 27*b* of the flavorant disk 3*c*, simultaneously dissolving flavorant at both surfaces. As the flavorant disk 3*c* dissolves, its inner surface 27*b* increases in surface area while the outer surface 27*a* increases in surface area. These two effects tend to offset one another in the total area of the flavorant cylinder 3*c* exposed to the liquid at a particular moment (e.g., initially at surfaces 27*a* and 27*b*, later at surfaces 27*a*' and 27*b*'), such that the exposed area and the dissolution rate remains more constant as the flavorant cylinder 3*c* dissolves.

In some embodiments, the flavorant disk 3*c* includes a plurality of concentric rings 28*a*, 28*b* and 28*c*, attached to its bottom. The rings are configured to enhance the draining and drying of the flavorant disk 3*c* by preventing the bottom of the flavorant disk 3*c* from being in direct contact with the filter.

Figure 9:
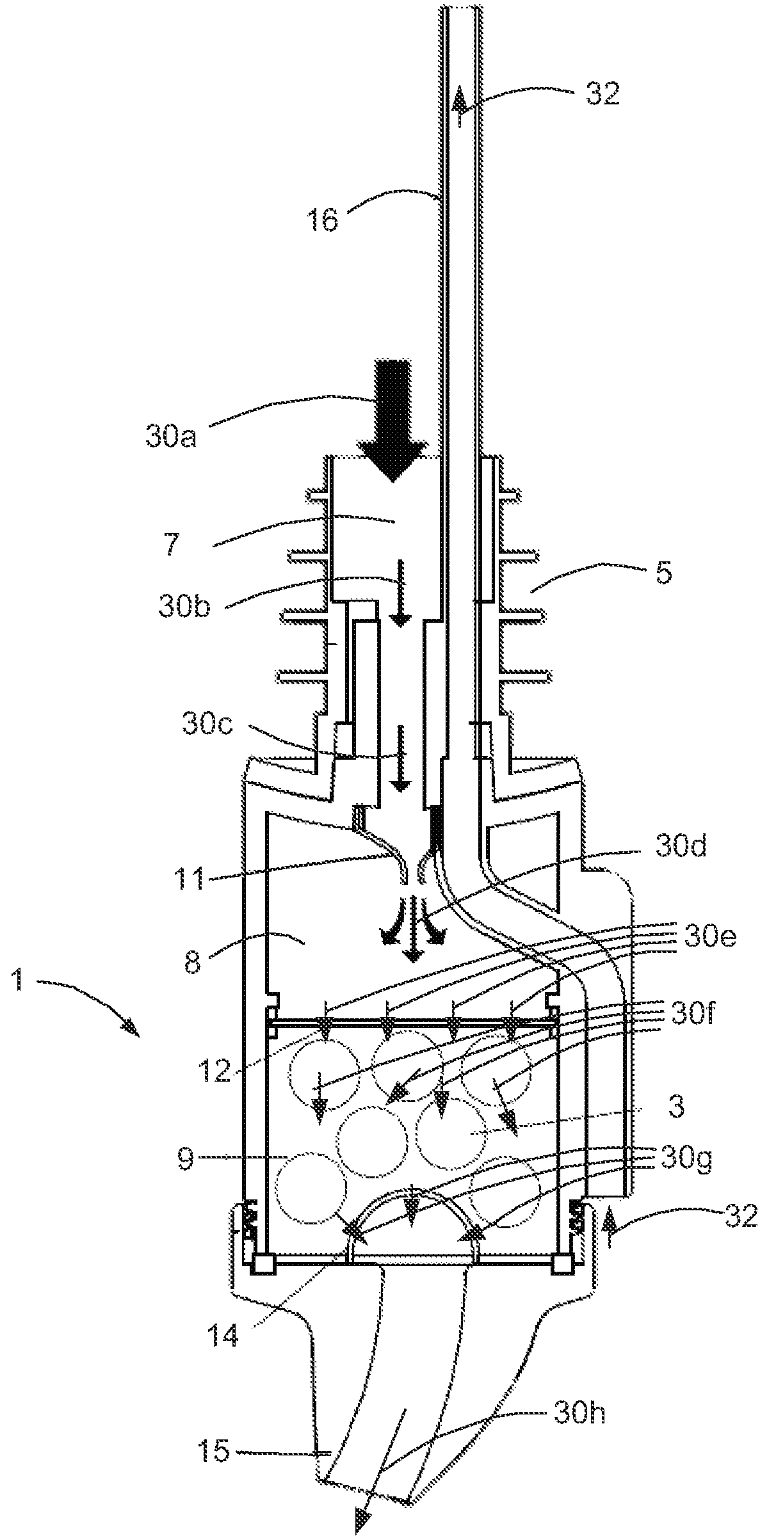
FIG. 9 illustrates a pouring method using a pouring dispenser.

Referring next to FIG. 9, the method of using the pouring dispenser 1 is illustrated. During use, the pouring dispenser 1 is inverted, such that the base 5 is higher than the pour spout 15. The arrows 30*a*, 30*b*, 30*c*, 30*d*, 30*e*, 30*f*, 30*f* and 30*h* indicate the flow of the liquid from the recipient, through the liquid intake 7, through the valve 11, through lower chamber portion 8, through the filter 12, through the upper chamber portion 9 where it dissolves the flavorant 3, through the filter 14 and through the pour spout 15, respectively. During use, air flows from the atmosphere through the venting tube 16 into the bottle, as indicated by the arrows 32.

The dispenser may also be equipped with a metering device (not shown) that halts the flow of liquid into the dispenser once a predetermined amount of liquid has passed through the metering device on a single pour. Such metering devices are fairly well known in the art and may be fashioned into the base of the dispenser body below (upstream of) the valve, for example.

A number of embodiments of the invention have been described. Nevertheless, it will be understood that various modifications may be made without departing from the spirit and scope of the invention. Accordingly, other embodiments are within the scope of the following claims.

What is claimed is:

1. A bottle pouring dispenser comprising:

a dispenser housing having a lower end configured to be removably attached to and cover an open end of a bottle;

a valve providing one-way hydraulic communication from the bottle to a chamber defined within the dispenser housing and having upper and lower chamber portions, such that with the bottle pouring dispenser attached to an open end of a bottle containing a liquid, liquid passes through the valve into the chamber as the bottle is inverted, and is prevented from returning to the bottle when righted;

a flavorant disposed within the upper chamber portion in form of multiple disconnected solid flavorant pieces that are dissolvable in liquid so as to add flavoring to liquid flowing through the upper chamber portion as the bottle is inverted, the flavorant held spaced above a floor of the chamber, such that a lower portion of the chamber defines a drain volume beneath the flavorant for receiving liquid draining from about the flavorant with the bottle righted;

a filter disposed at a top of the upper chamber portion and configured to retain undissolved flavorant in the upper chamber portion, as the bottle is inverted;

a barrier disposed between the upper and lower chamber portions, the barrier being configured to define drain passages smaller than the flavorant pieces, such that the flavorant pieces are prevented from passing into the lower chamber portion and are prevented from dissolving in the liquid as the bottle is righted; and a pour spout extending from an upper end of the dispenser housing, for dispensing flavored liquid from the chamber.

2. The bottle pouring dispenser of claim 1, further comprising a venting tube defining an unimpeded air path providing hydraulic communication between the bottle and atmosphere.

3. The bottle pouring dispenser of claim 1, wherein the lower portion of the chamber defines a minimum drain volume of 5 ml.

4. The bottle pouring dispenser of claim 1, wherein the pour spout comprises a filter retaining undissolved flavorant in the upper chamber portion.

5. The bottle pouring dispenser of claim 1, wherein the flavorant is in a granular form, the dispenser containing multiple flavorant granules.

6. The bottle pouring dispenser of claim 5, wherein the granules are substantially spherical.

7. The bottle pouring dispenser of claim 5, wherein the granules are substantially cubical.

8. The bottle pouring dispenser of claim 5, wherein each granules has internal flavorant concentration that varies from a surface to a core of the granule.

9. The bottle pouring dispenser of claim 1, wherein the flavorant is in a waffle form.

10. The bottle pouring dispenser of claim 1, wherein the flavorant is comprised within a bag.

11. The bottle pouring dispenser of claim 1, wherein substantially all of the flavorant is in the form of a unitary solid mass.

12. The bottle pouring dispenser of claim 11, wherein the flavorant is deposited on one or more walls of the upper chamber portion.

13. The bottle pouring dispenser of claim 1, wherein the flavorant is dissolvable in alcohol.

14. The bottle pouring dispenser of claim 1, wherein the flavorant comprises a colorant.

15. The bottle pouring dispenser of claim 1, comprising an at least partially transparent wall through which the upper chamber portion is visible from outside the dispenser.

16. The bottle pouring dispenser of claim 1, wherein the upper chamber portion is removably attached to the lower chamber portion and removable so as to enable refilling of the upper chamber portion with flavorant.

17. The bottle pouring dispenser of claim 1, wherein the upper chamber portion and the lower chamber portion are encapsulated in a compact protective layer.

18. The bottle pouring dispenser of claim 1, wherein the upper chamber portion defines a plurality of compartments, each alternatively selectable for hydraulic communication with the bottle through the valve.

19. The bottle pouring dispenser of claim 18, wherein each compartment contains a different flavorant.

20. The bottle pouring dispenser of claim 18, wherein a first of the compartments contains a flavorant and a second of the compartments is free of flavorant, the dispenser being manually configurable to either pass liquid through the first compartment for flavoring, or to pass liquid through the second compartment without flavoring.

21. The bottle pouring dispenser of claim 1, wherein the lower end is one of a snap on and a screw on type.

22. A bottle pouring dispenser comprising:

a dispenser housing having a lower end configured to be removably attached to and cover an open end of a bottle;

a chamber defined within the dispenser housing and having upper and lower chamber portions;

a flavorant disposed within the upper chamber portion in form of multiple disconnected solid flavorant pieces that are dissolvable in liquid so as to add flavoring to liquid flowing through the upper chamber portion as the bottle is inverted, the flavorant held spaced above a floor of the chamber, such that a lower portion of the chamber defines a drain volume beneath the flavorant for receiving liquid draining from about the flavorant;

a filter disposed at a top of the upper chamber portion and configured to retain undissolved flavorant in the upper chamber portion, as the bottle is inverted;

a barrier disposed between the upper and lower chamber portions, the barrier being configured to define drain passages smaller than the flavorant pieces, such that the flavorant pieces are prevented from passing into the lower chamber portion and are prevented from dissolving in the liquid as the bottle is righted;

a pour spout extending from an upper end of the dispenser housing, for dispensing flavored liquid from the chamber; and means for preventing flow of fluid from the dispenser back into the bottle.

23. The bottle pouring dispenser of claim 22, wherein the means for preventing flow comprises a trap tube.

* * * * *